United States Patent
Dickinson et al.

[19]

[11] Patent Number: 5,857,160
[45] Date of Patent: Jan. 5, 1999

[54] SENSOR-RESPONSIVE CONTROL METHOD AND APPARATUS

[75] Inventors: John E. Dickinson, Brighton; Douglass L. Carson, Walled Lake; Mutasim Abdurrahman Salman, Rochester Hills; Stephen Robert Pastor, Farmington Hills; Gordon Leo Tierney, Washington; Hong Xing Hu, Rochester Hills; Todd Brown, Brighton; Alan James Lee, Farmington Hills; Eldon Gerrald Leaphart, Southfield, all of Mich.

[73] Assignee: General Motors Corporation, Detroit, Mich.

[21] Appl. No.: 664,321

[22] Filed: May 23, 1996

[51] Int. Cl.⁶ .................................................... G06G 7/76
[52] U.S. Cl. ................................ 701/41; 701/42; 180/446
[58] Field of Search ...................... 364/424.051, 424.052, 364/424.053, 426.016, 426.01, 424.047, 424.029, 426.027, 424.045, 424.054; 180/408, 410, 422, 446, 415, 421, 168, 282, 423, 233, 197; 280/707, 91.1; 701/41, 42, 36, 70

[56] References Cited

U.S. PATENT DOCUMENTS

| | | | |
|---|---|---|---|
| 4,666,013 | 5/1987 | Shibahata et al. | 364/424.052 |
| 4,834,205 | 5/1989 | Mizuno et al. | 364/424.052 |
| 4,998,593 | 3/1991 | Karnopp et al. | 701/41 |
| 4,999,776 | 3/1991 | Soltis et al. | 364/424.051 |
| 5,001,637 | 3/1991 | Shiraishi et al. | 364/424.051 |
| 5,203,420 | 4/1993 | Shiraishi | 180/79.1 |
| 5,261,503 | 11/1993 | Yasui | 701/41 |
| 5,388,658 | 2/1995 | Ando et al. | 364/426.037 |
| 5,422,810 | 6/1995 | Brunning et al. | 364/424.05 |
| 5,428,532 | 6/1995 | Yasuno | 364/424.058 |
| 5,465,210 | 11/1995 | Walenty | 364/424.05 |
| 5,508,929 | 4/1996 | Harada | 364/424.058 |
| 5,521,820 | 5/1996 | Wakamatsu et al. | 701/42 |
| 5,606,502 | 2/1997 | Adachi et al. | 364/424.045 |
| 5,627,754 | 5/1997 | Asanuma et al. | 701/41 |

FOREIGN PATENT DOCUMENTS

| | | | |
|---|---|---|---|
| 0 444 365 A2 | 1/1991 | European Pat. Off. | G05D 13/62 |
| 2 257 551 | 1/1993 | United Kingdom | G06F 15/20 |
| 2 269 571 | 2/1994 | United Kingdom | B62D 6/00 |

OTHER PUBLICATIONS

Automobiles—May The Cornering Force Be With You; Popular Mechanics; Dec. 1995; pp. 74–77.

The Spin Doctors; Don Sherman; 12PS95 Controlling Vehicle Stability; C.A. Sawyer; Automotive Industries; Jan. 1995; pp. 48 & 50.

Technoid: Intelligent Brakes are on the Way; Car and Driver Magazine; Aug. 1994.

*Primary Examiner*—Jacques H. Louis-Jacques
*Attorney, Agent, or Firm*—Anthony Luke Simon

[57] ABSTRACT

A sensor-responsive control method for use on a motor vehicle, comprising the steps of: measuring a vehicle yaw rate; measuring a vehicle lateral acceleration; responsive to the measured yaw rate and lateral acceleration, estimating a steering wheel angle; determining an error signal responsive to the difference between the estimated steering wheel angle and an adaptive steering position signal; and updating the adaptive steering position signal responsive to the error signal, wherein the adaptive steering position signal is quickly determined after the vehicle begins to move.

6 Claims, 10 Drawing Sheets

SENSOR-RESPONSIVE CONTROL METHOD AND APPARATUS

This invention relates to a sensor-responsive control method and apparatus.

BACKGROUND OF THE INVENTION

Certain chassis control systems for motor vehicles utilize information such as steering wheel position as measured by a steering wheel position sensor. Many known steering wheel position sensors have limited accuracy and thus cannot be used with controls requiring high accuracy steering information. Other steering wheel position sensors have high precision, but no signal indicating when the steering wheel in "on center," that is, there is no signal indicating when the steering wheel is in the position directing the vehicle in a straight line forward direction. There are several reasons for this, including that if a sensor provided with an "on center" signal, once the sensor was installed in the vehicle, the "on center" signal might be inaccurate due to tolerances in the manufacture and/or assembly of the vehicle, or due to changes in the vehicle as the vehicle ages.

SUMMARY OF THE PRESENT INVENTION

It is an object of this invention to provide a sensor-responsive control method and apparatus as set forth in claim 1.

Advantageously, this invention provides a method and apparatus suitable for determining the center position of a steering wheel angle sensor, thus providing a sensor-responsive control signal accurately indicating the position of the vehicle steering wheel relative to a position at which the vehicle will move in a straight line forward direction.

Advantageously, this invention is useful for determining the steering wheel center position of a steering wheel sensor that is a digital device and provides an index counter position for every increment of rotation of the steering wheel but does not necessarily, of its own, provide an accurate center position signal.

Advantageously, in one example, this invention uses wheel speed sensors, a yaw rate sensor and a lateral accelerometer to determine an estimation of steering wheel angle. An error between the estimate and a steering wheel position counter is determined and the steering wheel position counter is adaptively updated in response to the error.

Advantageously, in a preferred example implementation of this invention, a sensor-responsive control method for determining a center position of a steering wheel angle sensor is provided comprising the steps of: A sensor-responsive control method for use in a motor vehicle, comprising the steps of:

receiving, from a steering wheel sensor, up pulses when a steering wheel is turned in a first direction and down pulses when the steering wheel is turned in a second direction; incrementing a counter in response to the up pulses; decrementing the counter in response to the down pulses; adaptively determining an output indicative of steering wheel position responsive to vehicle yaw rate; and adjusting the counter responsive to the output, wherein the counter quickly represents an accurate indication of steering wheel position.

Advantageously, in another preferred example implementation of this invention, a sensor-responsive control apparatus for determining a center position of a steering wheel angle sensor is provided, comprising:

a steering wheel sensor providing up pulses when a steering wheel is turned in a first direction and down pulses when the steering wheel is turned in a second direction; a counter responsive to the up and down pulses, wherein the counter increments in response to the up pulses and decrements in response to the down pulses; an adaptive controller for adaptively determining an output indicative of steering wheel position responsive to vehicle yaw rate, wherein the counter is also responsive to the output.

BRIEF DESCRIPTION OF THE DRAWINGS

The a sensor-responsive control method and apparatus according to this invention will now be described by way of example with reference to the following drawings in which.

DETAILED DESCRIPTION OF THE INVENTION

Figure 1:
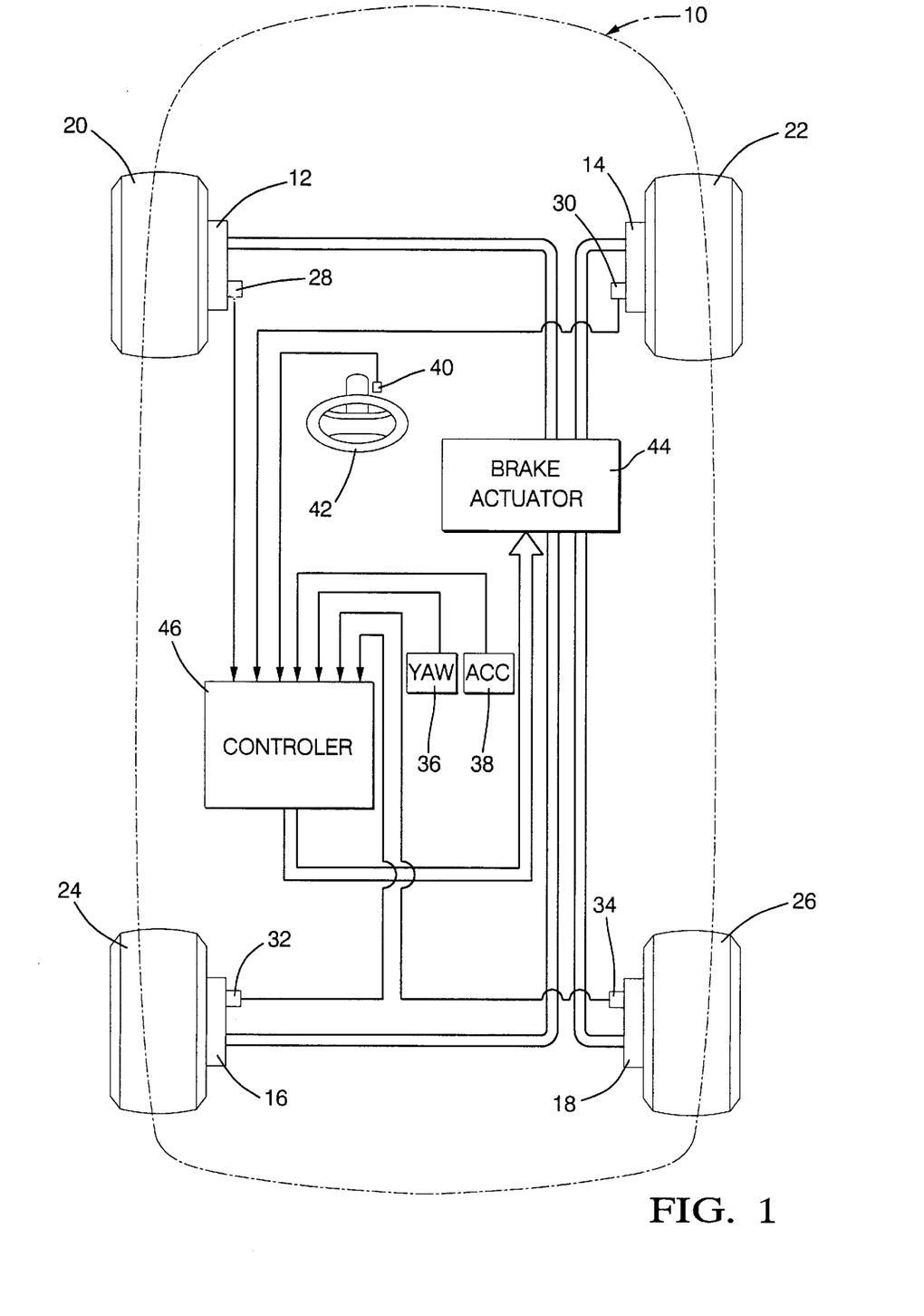
FIG. 1 illustrates a schematic of a vehicle including an example apparatus according to this invention.

Referring now to FIG. 1; the vehicle 10 includes four wheels 20, 22, 24 and 26, each with associated wheel brakes 12, 14, 16 and 18. Each wheel 20–26 has a wheel speed sensor 28, 30, 32 and 34 of a known type providing wheel speed information to the microprocessor-based controller 46. The controller 46 also receives steering wheel position information for steering wheel 42 from position sensor 40. Position sensor 40 may be a digital sensor that provides output signals that can be used to increment a digital position signal with each degree or partial degree of movement of the steering wheel 42 in one direction and decrement the digital position signal with each degree or partial degree of movement in the opposite direction. In one example, the digital position signal is maintained in and updated by controller 46. The steering wheel sensor 40 need not have an inherent center position signal capability, but such capability may be included to serve as a guide indicating that the steering wheel is approximately on center. Such steering wheel sensors 40 are well known to those skilled in the art.

According to the preferred example, this invention provides a method and apparatus for determining the position of sensor 40, relative to the "on center" position. That is, this invention determines the position signal of sensor 40 relative to the position signal that occurs when the steering wheel 42 is steered to drive the vehicle 10 in a straight line forward direction.

In carrying out this function, controller 46 also receives signals from yaw rate sensor 36 and lateral accelerometer 38 to effect the controls described herein. The controller 46, in general, controls a brake actuator or actuators 44 for controlling the wheel brakes 12, 14, 16 and 18 to provide any suitable type of chassis control for the vehicle. Suitable example brake actuators 44 are well known to those skilled in the art and need not be set forth herein in detail. Known control techniques used to control brake actuators 44, such as Active Brake Controls or four wheel steer controls with active braking, are responsive to the steered position of the vehicle front wheels. Thus, by providing an improved determination of the position of the steering wheel angle sensor 40 relative to the "on center" position, the quality of the information used in the active brake controls (or other steering-responsive control, such as active chassis, suspension, or variable assist steering control) is improved.

Because the brake controls are not germane to this invention and may be any type of control presently known or in the future known to those skilled in the art that is responsive to steering wheel position, further detail of such controls are not set forth herein. Those skilled in the art will recognize that the brake control is considered generic for purposes of this description and the brake control referred to herein may encompass any known brake control. It will also be apparent to those skilled in the art that the chassis control implemented using this invention is not limited to brake control, but may also be, for example, a chassis control that uses variable force actuators in the vehicle suspension and controls the variable force actuators responsive to a steering wheel position signal.

The controller 46, in performing the control algorithms, relies on information from the wheel speed sensors 28, 30, 32 and 34, the yaw rate sensor 36, the lateral accelerometer 38 and the steering wheel position sensor 40. The preferred example of this invention provides adaptive calibration of the steering wheel position sensor 40 using information from the other sensors. However, the yaw rate sensor 36 and lateral accelerometer 38 may also have errors due to temperature or time, and the errors will affect the accuracy of information provided by the sensors. In the example below, errors in the outputs of yaw rate sensor 36 and accelerometer 38 are accounted for before the steering wheel position sensor is adaptively calibrated.

Figure 2:
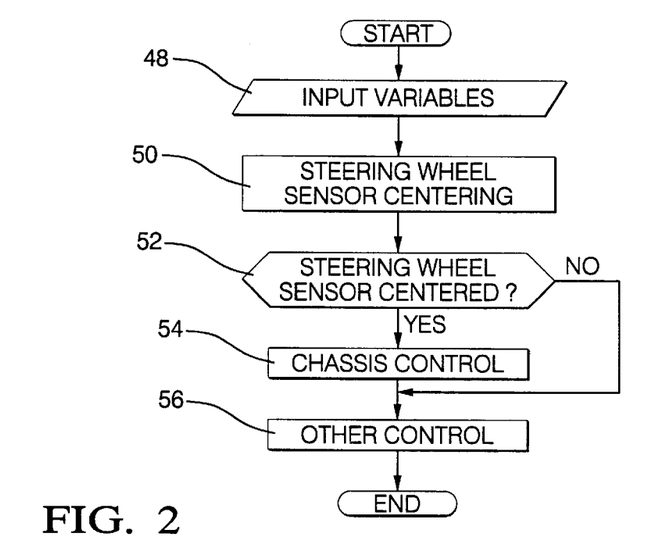
FIGS. 2–10 illustrate flow diagrams of an example control routine for implementing this invention.

Referring now to FIG. 2, the example main flow control routine shown is run by the microprocessor within controller 46 using commands stored in ROM or EPROM or other alternative memory device. In general, the routine starts and performs required system maintenance and start-up functions of a type known to those skilled in the art. The routine then moves to block 48 where the various sensor information is received and then to block 50 where it performs the steering wheel sensor center determination functions described in detail below with reference to FIGS. 3–10.

After performing the functions at block 50, the routine moves to block 52 where it determines whether or not block 50 has completed the function of determining the steering wheel center position, i.e., by checking an appropriate flag, referred to below as the "STEER_CENTER" flag. If, at block 52, the flag is set, the chassis control routines represented by block 54 that require accurate steering wheel position information are enabled. If, at block 52, the appropriate flag is not set, the routine skips the chassis control routines at block 54 and continues to block 56 where other brake or chassis control routines not requiring the centered steering wheel sensor signal may be implemented.

The chassis control routine at block 54 may include any known or future type of chassis control responsive to a steering wheel position signal requiring an accurate steering wheel position signal. Such controls include active brake control systems, active suspension control systems, variable assist power steering systems, etc., for which controls examples are known to those skilled in the art. Because such control routines are not germane to this invention, detailed description thereof will not be set forth herein.

Examples of control functions at block 56 include known anti-lock brake and traction controls that may be implemented without an accurate determination of the steering wheel position such as provided by this invention. Examples of such antilock brake and traction controls are well known to those skilled in the art and need not be set forth herein in detail.

Figure 3:
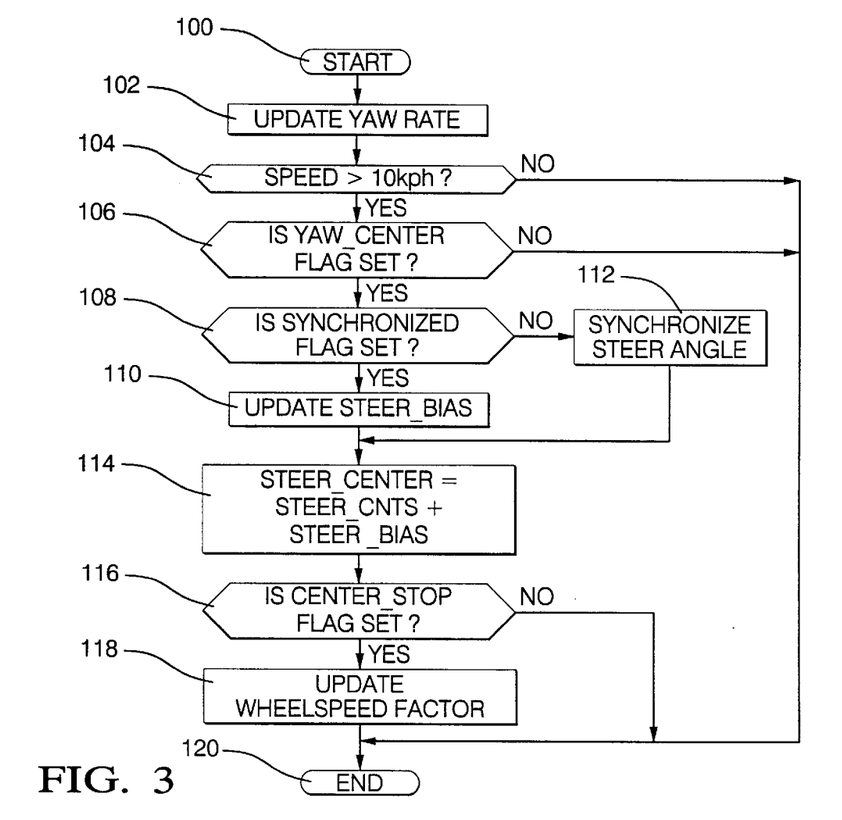

Referring now to FIG. 3, the subroutine performed at block 50 (FIG. 2) for determining the steering wheel sensor position relative to "on center" is shown. The routine starts at block 100 and moves to block 102 where it updates the measured yaw rate signal according to the subroutine shown in FIG. 4.

Figure 4:
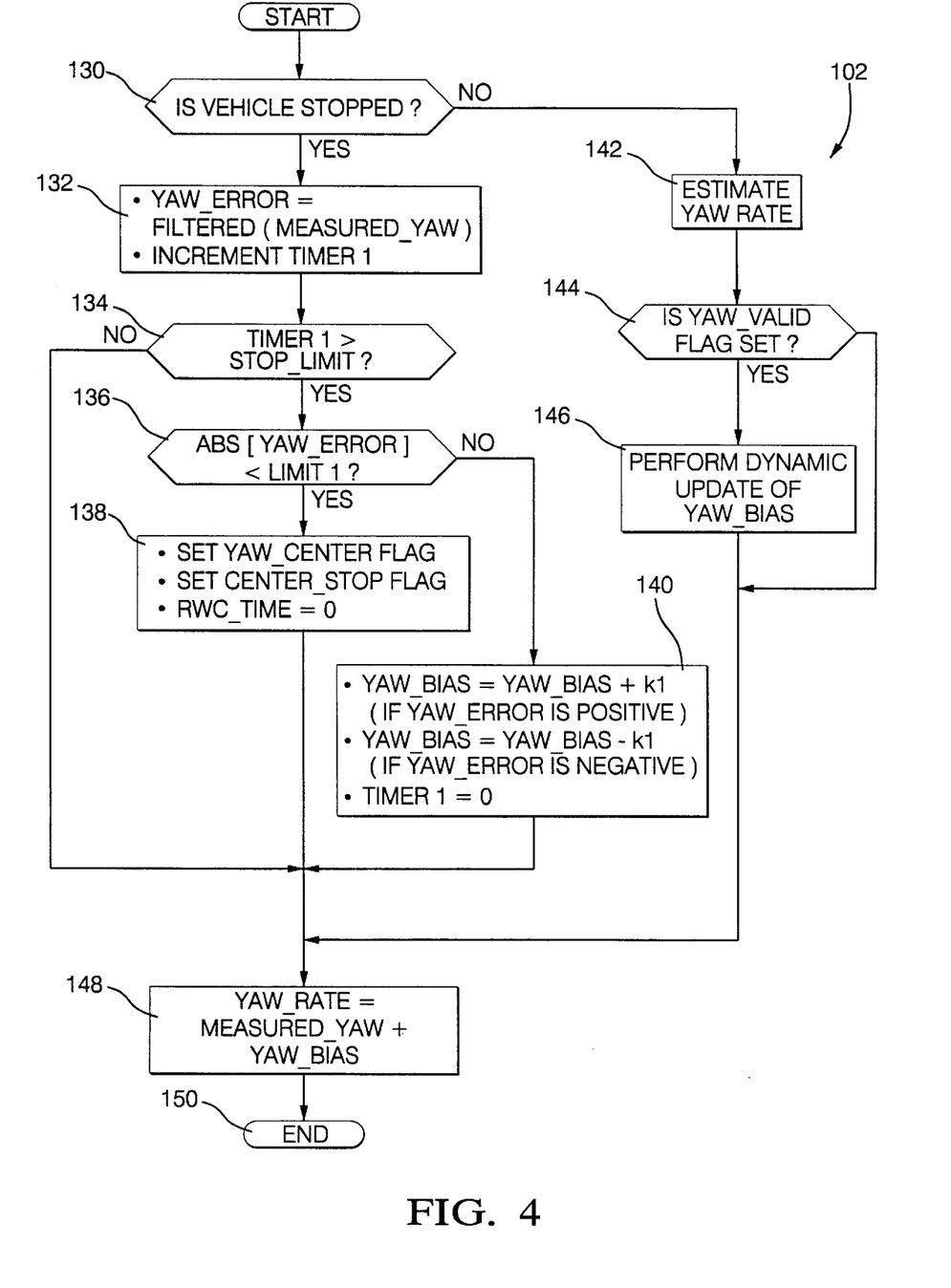

Referring now to FIG. 4, the yaw rate signal update routine operates in two modes—a first mode when the vehicle is stopped and a second mode when the vehicle is moving. This subroutine allows continual calibration of the yaw rate sensor to compensate for both changes in bias over long periods of time and for short term changes due to thermal variation of the sensor package. Once the true yaw rate is known, the controller will then be able to determine the initial position of the steering sensor and the thermal effects of the lateral accelerometer can be removed with continuous update of the apparent steer bias (described further below).

The test to determine whether the vehicle is stopped is performed at block 130 and may rely on either the vehicle speed signal as provided in a known manner from the vehicle speed sensor in the transmission or on the wheel speed sensor signals from sensors 32 and 34, shown in FIG. 1. The sensors 32 and 34 provide the speed signals for the undriven wheels and may be averaged and filtered to provide the vehicle speed signal.

In addition, the tests at block 130 may be implemented with a second steering wheel position sensor (not shown) such as a known analog sensor of a type that provides approximate steering wheel position information not of sufficient accuracy required by the active brake control or other chassis control. If the additional sensor is used, then the test at block 130 is only passed if the approximate analog sensor indicates that the steering wheel is turned less than a preset limit, for example 90 degrees.

If the vehicle is stopped at block 130, i.e., the vehicle speed signal is zero, the routine moves to block 132 where the variable YAW_ERROR representing the error or the bias from the yaw rate sensor is set equal to a filtered value of the yaw rate sensor output, MEASURED_YAW. Block 132 implements the concept that the bias error in the yaw rate sensor is assumed to be the non-zero sensor output when the vehicle is not moving and, therefore, is experiencing a yaw rate of zero.

A single order lag filter with a time constant of, for example, 0.3 seconds is used to filter MEASURED_YAW at block 132. The filter protects the offset determination from signals such as caused by the vehicle doors being slammed closed, etc. Also at block 132, the value TIMER1 is incremented.

At block 134 the value TIMER1 is compared to a threshold STOP_LIMIT. If TIMER1 is not greater than STOP_LIMIT, then the routine jumps to block 148, skipping the steps that update the bias to the measured yaw rate signal. At block 148, the routine determines the command YAW_RATE equal to the sum of MEASURED_YAW and YAW_BIAS.

The variable STOP_LIMIT at block 134 corresponds to a value of about one second to allow a sufficient number of samples of MEASURED_YAW from the yaw rate sensor between successive updates of the value YAW_BIAS.

When TIMER1 has a value greater than STOP_LIMIT at block 134, the routine moves to block 136.

At block 136, the routine compares the absolute value of YAW_ERROR to a threshold, LIMIT1. LIMIT1 is preset to a fairly small value, for example 0.5 degrees/second, and a YAW_ERROR less than LIMIT1 represents that the value of YAW_ERROR is small enough that the YAW_BIAS variable does not need to be updated. If the absolute value of YAW_ERROR is not less than LIMIT1, the routine moves to block 140 where it updates the value YAW_BIAS as follows:

YAW_BIAS=YAW_BIAS+$k1$(if YAW_ERROR is positive),

YAW_BIAS=YAW_BIAS-$k1$(if YAW_ERROR is negative), where k1 is a predetermined constant, representing an incremental value (i.e., 0.5°/s) at which YAW_BIAS is allowed to change with each loop through block 140. Also at block 140, the value TIMER1 is reset to zero. From block 140, the routine continues to block 148, described above.

If, at block 136, the absolute value of YAW_ERROR is less than LIMIT1, the routine moves to block 138 where it sets the flags YAW_CENTER and CENTER_STOP. The CENTER_STOP flag tells the system that the calibration of yaw rate has achieved a desired level of accuracy when the vehicle is stationary, and that the yaw rate information can be used to estimate steering wheel angle and the wheel speed correction factor (block 118, FIGS. 3 and 10, described below). Also at block 138, the timer, RWC_TIME, representing the time since the last positive check on the yaw rate sensor accuracy, is set to zero. From block 138 the routine continues to block 148 described above.

Referring again to block 130, if the vehicle is in motion, the update to the yaw rate bias according to blocks 142–146 is performed. These steps are implemented because the vehicle may be driven for long intervals of time without stops. In cold winter or hot summer conditions the yaw sensor temperature may change significantly. Without a mechanization to update the YAW_BIAS to compensate for these thermal changes, significant error can be introduced into the control system. In general, this is accounted for by introducing continual checks on the difference between the yaw rate from the sensor measurement and the estimated value from the differential wheel speed variation. To prevent tire wear or size differences from causing errors in this process, the yaw rate sensor is first calibrated in the vehicle stop position (as described above), then the wheel speed correction factor is determined (as described below with reference to block 118, FIG. 3) and then the update blocks 142–146 become operative. Because thermal changes in the yaw rate sensor typically occur at a slow rate, waiting for determination of the wheel speed correction factor before the yaw rate is dynamically adjusted has little adverse effect.

Once the wheel speed correction factor is known (block 118, FIG. 3, described below), the yaw rate sensor bias is updated from measured wheel speed signals, thus compensating for thermal drift of the yaw rate sensor. Since tire wear occurs very slowly, the wheel speed correction factor can be saved at vehicle shut down and used at vehicle power-up to initially calibrate the yaw rate sensor if the car starts so quickly that the calibration-at-rest process (blocks 132–140) has not been completed. A precondition on this function is that the estimated and measured yaw rates are in relatively close agreement. This check assures that no mini-spare or new tire has been added to the vehicle.

Thus, if the vehicle is moving, the routine continues from block 130 to block 142 where a subroutine is run to estimate the vehicle YAW rate based on the wheel speeds of the non-driven vehicle wheels, i.e., wheels 24 and 26 in FIG. 1. The subroutine performed at block 142 is illustrated in FIG. 5.

Figure 5:
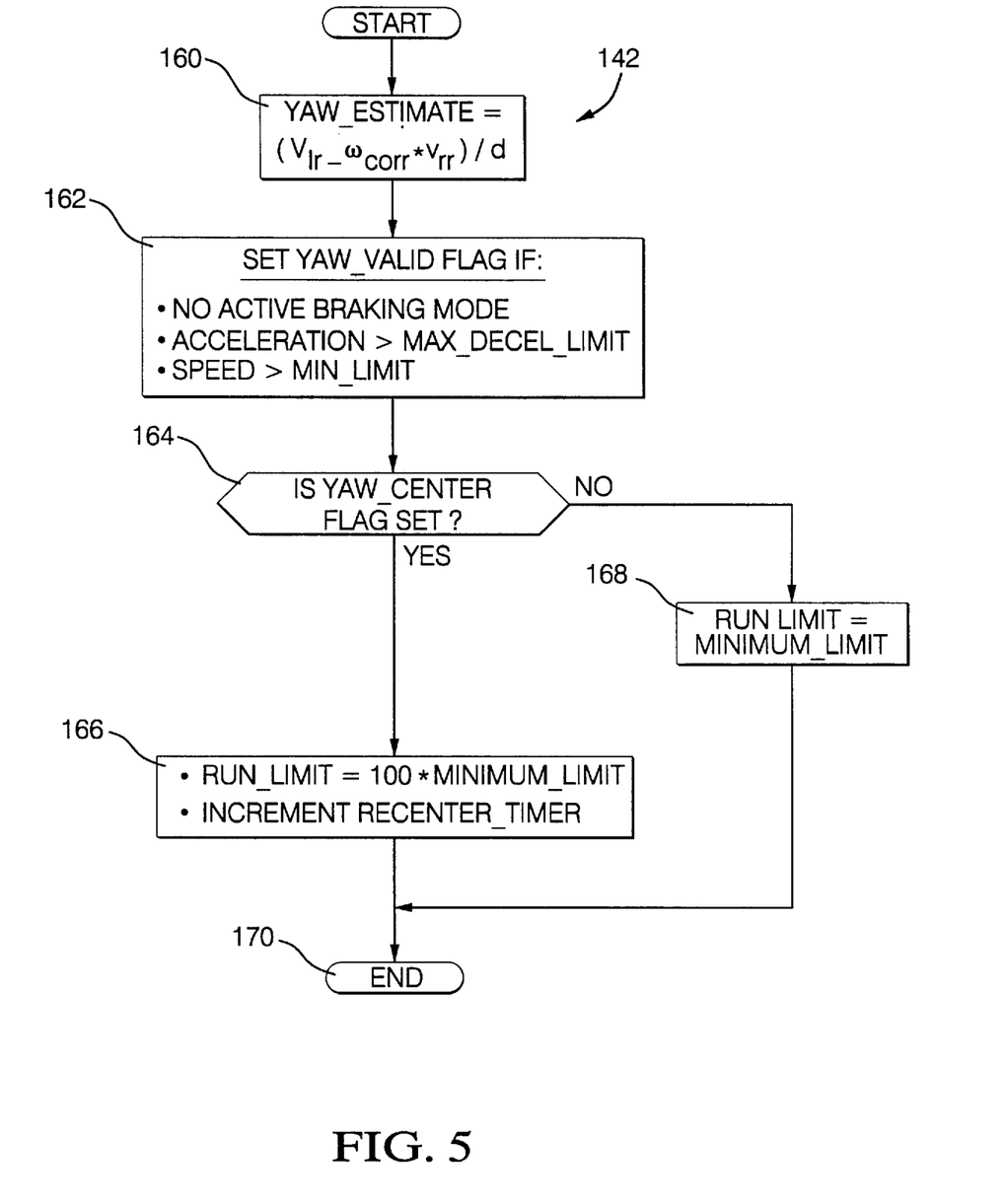

Referring now to FIG. 5, the subroutine for estimating yaw rate operates on the principle that, during normal driving conditions, when the brakes are not being applied and there are only small lateral accelerations imposed upon the vehicle, the differential wheel speed of the non-driven pair of wheels can provide an accurate measure of yaw rate. The subroutine begins and moves to block 160 where it determines the estimated yaw rate, YAW_ESTIMATE, as follows:

YAW_ESTIMATE=$(V_{1r}-\omega_{corr}*V_{rr})/d$, where $V_{1r}$ is the measured left rear wheel speed, $V_{rr}$ is the measured right rear wheel speed, $\omega_{corr}$ is the correction factor determined as described below with reference to block 308 in FIG. 10 and d is the track width, or distance between the rear wheels of the vehicle. The determination of YAW_ESTIMATE at block 160 assumes a front wheel drive vehicle. For a rear wheel drive vehicle, the YAW_ESTIMATE is determined as follows:

YAW_ESTIMATE=$(V_{1f}-\omega_{corr}*V_{rf})/(d*\cos(\theta/K_{gr}))$ where $V_{1f}$ is the measured front left wheel speed, $V_{rf}$ is the measured front right wheel speed, $\theta$ is the steer angle of the wheels and $K_{gr}$ is the Ackerman steering constant for the vehicle.

From block 160 the routine moves to block 162 where the YAW_VALID flag, indicating whether or not the yaw estimation is valid, is set if all of the following conditions are met: (a) the vehicle is not in an active brake control mode, (b) the vehicle is not decelerating more than 0.2 G, and (c) the vehicle speed is greater than a predetermined threshold, for example, 10 kilometers per hour (km/h).

From block 162, the routine moves to block 164 where it determines whether or not the YAW_CENTER flag has been set. If the YAW_CENTER flag is set, the routine moves to block 166 where it sets the value RUN_LIMIT to a larger value than is set at block 168, where the routine moves if the YAW_CENTER flag is not set. For example, RUN_LIMIT is set at block 166 to one hundred times MINIMUM_LIMIT, while at block 168, RUN_LIMIT is set to MINIMUM_LIMIT. MINIMUM_LIMIT corresponds to about one second. Also at block 166, the timer, RECENTER_TIMER is incremented. From blocks 166 and 168, the subroutine in FIG. 5 moves to block 170 where it returns to the subroutine shown in FIG. 4.

Referring again to FIG. 4, once the subroutine at block 142 is completed, the routine continues to block 144 where it checks whether or not the YAW_VALID flag is set. If the YAW_VALID flag is not set, the routine moves to block 148, described above, and then exits at block 150. If at block 144 the YAW_VALID flag is set, the routine continues to block 146 where it performs the subroutine shown in FIG. 6 for dynamically updating the value YAW_BIAS while the vehicle is in motion.

Figure 6:
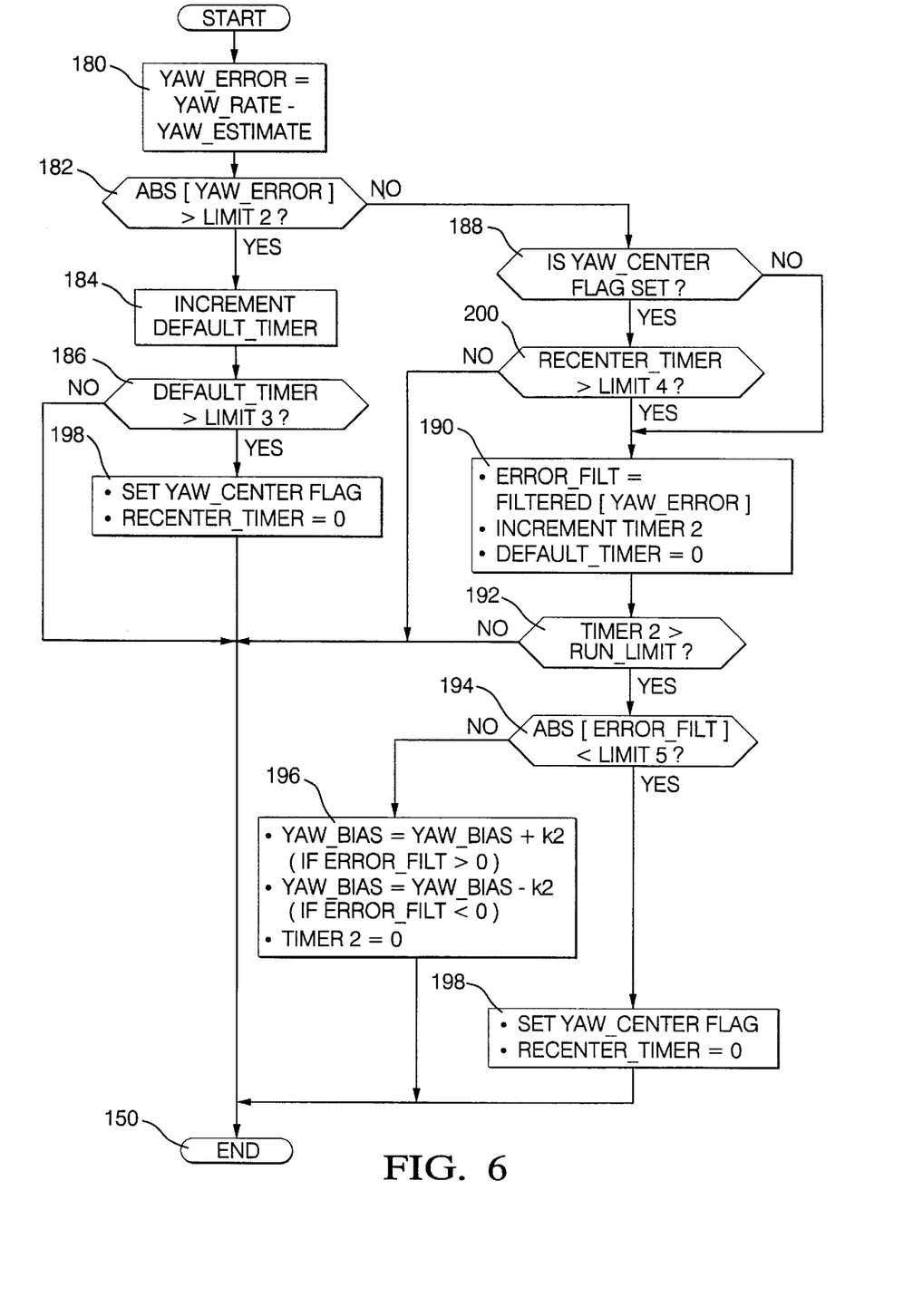

Referring now to FIG. 6, the subroutine performed at block 146 for dynamically updating the YAW_BIAS starts and moves to block 180 where the value YAW_ERROR is determined as the difference between YAW_RATE (determined at block 148, FIG. 4) and YAW_ESTIMATE (determined at block 142, FIG. 4). From block 180, the routine moves to block 182 where the absolute value of YAW_ERROR is compared to a predetermined threshold value, LIMIT2. The test at block 182 is designed to detect whether or not one of the vehicle tires has been replaced, i.e., by a tire with a different rolling radius, as when an old tire is replaced by a new tire with thicker tread or a tire being replaced by a spare, such an undersized spare. If YAW__ERROR is greater than the threshold at block 182, the routine assumes that a new tire has been placed on one of the wheels and continues to block 184 where the timer DEFAULT__TIMER is incremented. At block 186, DEFAULT__TIMER is compared to a threshold value, LIMIT3. If DEFAULT__TIMER is not greater than LIMIT3, the routine moves to block 202, exiting the subroutine 146.

At blocks 182–186, if the absolute value of YAW__ERROR is greater than LIMIT2 for only an amount of time less than the period established by LIMIT3, it is not assumed that one of the vehicle tires has been replaced and no action is taken. If the absolute value of YAW__ERROR is greater than LIMIT2 for a time period greater than LIMIT3, then the routine moves to block 198 where it sets the YAW__CENTER flag and resets the timer, RECENTER__TIMER to zero.

If in any of the loops through the subroutine 146, the YAW__ERROR is less than LIMIT2, the routine will not move to blocks 184 and 186. Instead, from block 182, the routine continues to block 188 where it determines whether or not the YAW__CENTER flag has been set. If the YAW__CENTER flag has been set, the routine continues to block 200 where it compares RECENTER__TIMER to a threshold, LIMIT4. If RECENTER__TIMER is not greater than LIMIT4, the subroutine 146 ends at block 202. If, at block 200, RECENTER__TIMER is greater than the LIMIT4, then the routine continues to block 190, the block to which the routine also continues if the YAW__CENTERED flag is not set at block 188. The value LIMIT4 minimizes the amount of time between successive updates to the YAW__BIAS and may be set as the system designer desires. One example setting for LIMIT4 is a value that corresponds to one hundred seconds between successive updates.

At block 190 a filtered value of YAW__ERROR, ERROR__FILT is determined using a simple lag filter with a 0.3 second time constant. Also at block 190, the value TIMER2 is incremented and the value DEFAULT__TIMER is set to zero. From block 190, the routine moves to block 192 where it compares the value TIMER2 to RUN__LIMIT, determined at blocks 166 and 168 in FIG. 5. If TIMER2 is not greater than RUN__LIMIT, then the subroutine 146 exits at block 202. If, at block 192, TIMER2 is greater than RUN__LIMIT, the routine continues to block 194 where it determines if the absolute value of ERROR__FILT is less than the threshold value, LIMIT5. LIMIT5 establishes whether or not the YAW__BIAS is to be updated and, for example, may be set to a value of 0.5 degrees/second. If the absolute value of ERROR__FILT is less than LIMIT5, then YAW__BIAS does not need to be updated and the routine continues to block 198 described above. If the absolute value of ERROR__FILT is not less than LIMIT5, the routine continues to block 196 where YAW__BIAS is updated according to:

YAW__BIAS=YAW__BIAS+$k2$(if ERROR__FILT>0), and

YAW__BIAS=YAW__BIAS−$k2$(if ERROR__FILT<0), where k2 is a predetermined constant (i.e., 0.5 degrees/second) limiting the amount that YAW__BIAS can be incremented in any one control loop through subroutine 146. At block 196 the value TIMER2 is also set to zero. The subroutine 146 is then exited at block 202.

Referring again to FIG. 4, after the subroutine at block 146 is performed, the routine continues to block 148 where, as described above, YAW__RATE is updated using the MEASURED__YAW and YAW__BIAS. The subroutine 102 is then exited at block 150.

Referring again to FIG. 3, after execution of the subroutine at block 102, the routine continues to block 104 where it compares the vehicle speed to a predetermined threshold, for example, 10 Km/h. If the vehicle speed is not greater than 10 Km/h, then the sensor centering routine 50 is exited at block 120. If, however, at block 104, the vehicle speed is greater than 10 Km/h, the routine continues to block 106 where it checks the YAW__CENTER flag. If, at block 106, the YAW__CENTER flag is not set, then the subroutine is exited at block 120. The test at block 106 sets as a precondition to updating the steering position signal the determination that bias errors in the measured yaw rate signal are first accounted for as described with reference to FIG. 4.

If, at block 106, the YAW__CENTER flag is set, the routine continues to block 108 where it checks the SYNCHRONIZED flag. If at block 108 the SYNCHRONIZED flag is not set, the routine continues to block 112 where it performs the subroutine shown in FIG. 7 for initializing the steer angle signal, STR__CNTS.

Figure 7:
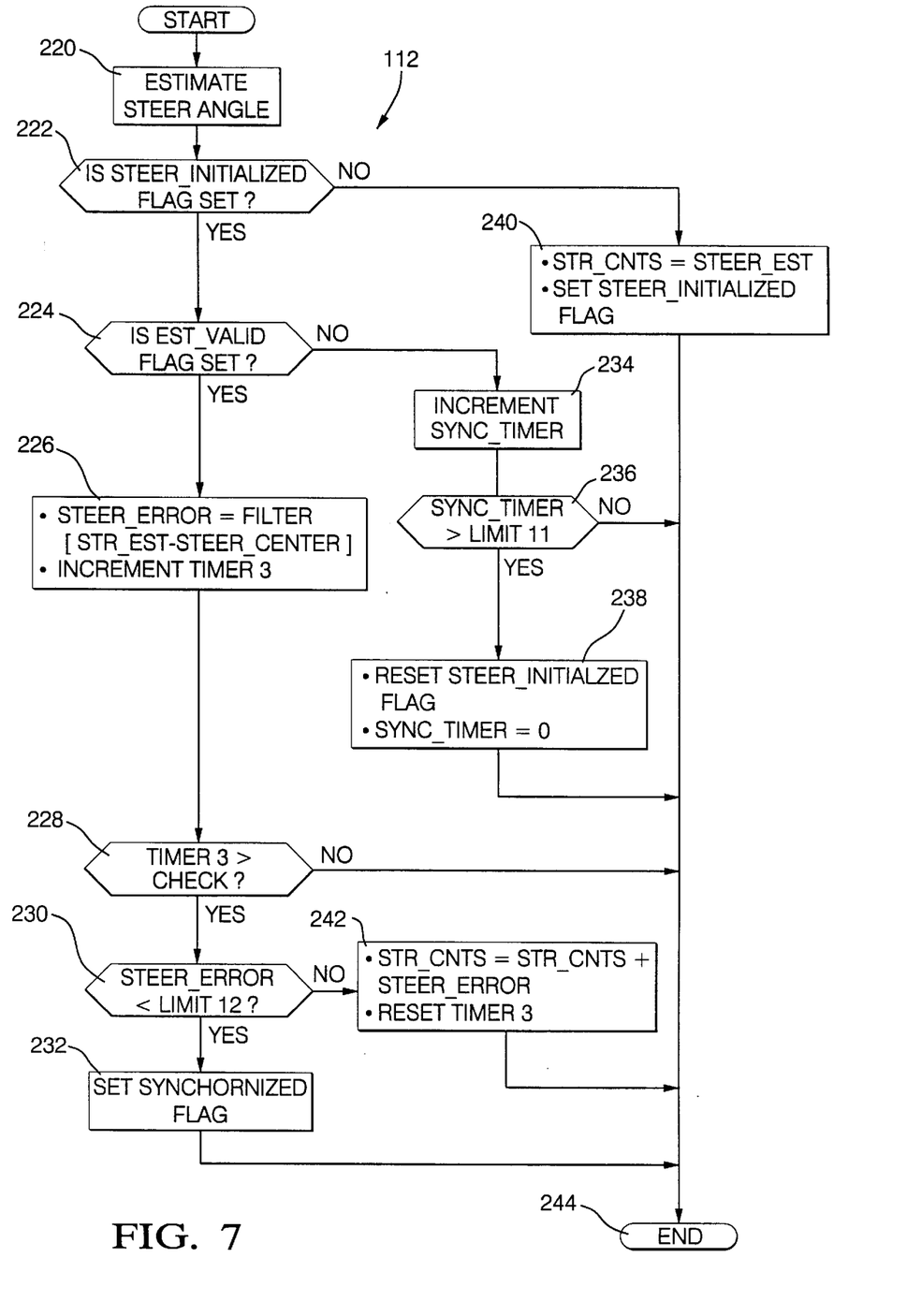

Referring now to FIG. 7, when the vehicle first powers up, the steer angle count from the steer angle sensor is initialized to the estimated steer angle. A filter upon the difference between the steer estimate and the value STEER__CENTER is used as a threshold check that the initialization process is complete. Whenever the check fails the error value is used to update the initial value. At the completion of a successful check upon the filtered error, the SYNCHRONIZED flag is set, which then enables the final calibration of the steering position. There is an outlet in case the initial steer estimate is very inaccurate. Since the steer estimate is only valid for limited range of steering angles, typically 20 degrees or less, an inaccurate initialization could continuously propagate. Thus the SYNC__TIMER checks that the vehicle is driving at greater than 10 km/h and that the estimate has been invalid for a period of, for example two seconds, before reinitializing.

Figure 8:
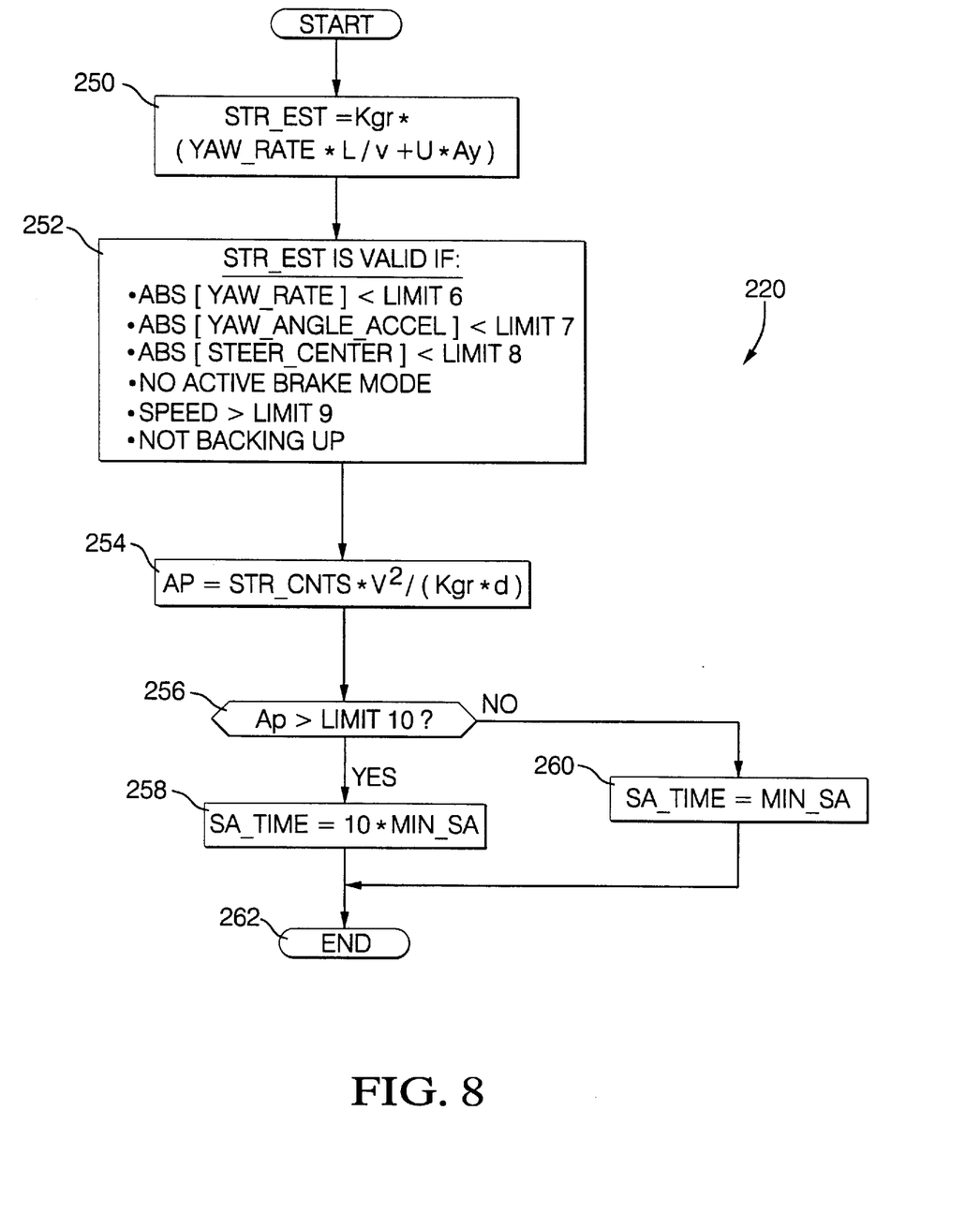

The subroutine 112 first moves to block 220 where it runs the subroutine shown in FIG. 8 for estimating the vehicle steering wheel steer angle. The steer angle is estimated with reference to a position at which the vehicle will steer to move in a straight line.

Referring now to FIG. 8, the subroutine for estimating the steering wheel angle starts and moves to block 250 where it performs an estimation calculation to determine STR__EST, the estimated steering wheel angular position, according to:

STR__EST=$Kgr*(YAW\_RATE*L/v+u*A_y)$ where Kgr is the Ackerman constant for the vehicle, determined in a manner known to those skilled in the art, L is the wheel base or distance between front and rear wheels, v is the vehicle speed, u is the understeer coefficient for the vehicle and $A_y$ is the vehicle's lateral acceleration as measured by the lateral acceleration sensor 38 (FIG. 1).

After STR__EST is determined at block 250, the routine continues to block 252 where it determines whether or not STR__EST is valid and, if so, sets a corresponding flag EST__VALID. The EST__VALID flag is set if the following conditions are met: (a) the absolute value of YAW__RATE is below a predetermined yaw rate limit, LIMIT6, for example 10 degrees/second; (b) the absolute value of yaw angular acceleration (i.e., determined as a derivative of YAW__RATE) is below a predetermined limit, LIMIT7, for example 4 degrees/second/second; (c) the absolute value of STEER_CENTER is below a predetermined limit, LIMIT8, for example 20 degrees; (d) the controller is not an active brake control mode; (e) the vehicle speed is above a predetermined threshold, LIMIT9, for example, 10 Km/h; and (f) the vehicle transmission is not in reverse. If any one of the above six conditions is not met, the EST_VALID flag is not set.

From block 252, the routine continues to block 254 where it sets a value, AP, representing what is referred to herein as the acceleration potential for the vehicle, according to the following equation:

$$AP=STR\_CNTS*v^2/(Kgr*d),$$

where STR_CNTS is determined as described below with reference to FIG. 7.

From block 254, the routine continues to block 256 where AP is compared to LIMIT10, for example 0.2 G. If AP is above LIMIT10, the routine moves to block 258 where it sets the timer limit, SA_TIME equal to 10 times its minimum value, MIN_SA, corresponding to, for example, 10 seconds. If, at block 256, AP is not above LIMIT10, the routine moves to block 260 where it sets SA_TIME equal to the minimum value, MIN_SA. From blocks 258 and 260, the subroutine 220 moves to block 262 where it ends.

Referring again to FIG. 7, once the subroutine 220 is completed, the routine moves to block 222 where it checks the STEER_INITIALIZED flag. If at block 222 the STEER_INITIALIZED flag is not set, the routine continues to block 240 where the value STR_CNTS is set equal to STR_EST and the STEER_INITIALIZED flag is set. From block 240 the subroutine 112 moves to block 244 where it ends.

If, at block 222, the STEER_INITIALIZED flag is set, the routine moves to block 224 where it checks the EST_VALID flag. If at block 224 the EST_VALID flag is not set, the routine continues to block 234 where it increments the timer SYNC_TIMER. At block 236, if SYNC_TIMER is greater than LIMIT11, its threshold value, the routine continues to block 238 where it resets the STEER_INITIALIZED flag and resets SYNC_TIMER to zero. If at block 236 SYNC_TIMER is not greater than LIMIT11, the routine continues to block 244 and ends. LIMIT11 is set to correspond to, for example, two seconds, and controls the time that the subroutine 112 will try to initialize STR_CNTS. If STR_CNTS is not initialized within the time limit LIMIT11, the STEER_INITIALIZED flag is reset (block 238) and in the next loop through subroutine 112, STR_CNTS is reset to the value STR_EST and subroutine 112 is run with each loop through the control routine until the SYNCHRONIZE flag is set at block 232 (described below). After block 238, the routine continues to block 244.

If at block 224 the EST_VALID flag is set, the routine continues to block 226 where it determines a value STEER_ERROR equal to a filtered result of the difference between STR_EST and STEER_CENTER. The filter implemented at block 226 may be a simple lag filter with a 0.3 second time constant. Also at block 226, TIMER3 is incremented.

From block 226 the routine moves to block 228 where it compares the value TIMER3 to a threshold value, CHECK. If, at block 228, TIMER3 is not greater than CHECK, then the routine exits at block 244. The threshold CHECK represents a delay necessary for the filter at block 226 to settle, which delay may be, for example, 1.0 seconds. If, at block 228, the value TIMER3 is greater than the threshold CHECK, the routine continues to block 230 where it compares STEER_ERROR to the threshold value LIMIT12. LIMIT12 represents a value small enough that if STEER_ERROR is less than LIMIT12, the computed steering angle is considered initialized and further loops through subroutine 112 are unnecessary. If, at block 230, STEER_ERROR is not greater than LIMIT12, the routine continues to block 242 where it updates the value STR_CNTS as follows:

STR_CNTS=STR_CNTS+STEER_ERROR, and resets the value TIMER3 to zero. From block 242, the subroutine moves to block 244 and exits. If, at block 230, STEER_ERROR is less than LIMIT12, the routine moves to block 232, where the SYNCHRONIZED flag is set. From block 232 the subroutine moves to block 244 and exits.

Referring again to FIG. 3, when the subroutine at block 112 is completed, the routine continues to block 114, described below. If at block 108 the SYNCHRONIZED flag was set, the routine continues to block 110 where it performs a subroutine for updating the value STEER_BIAS.

Figure 9:
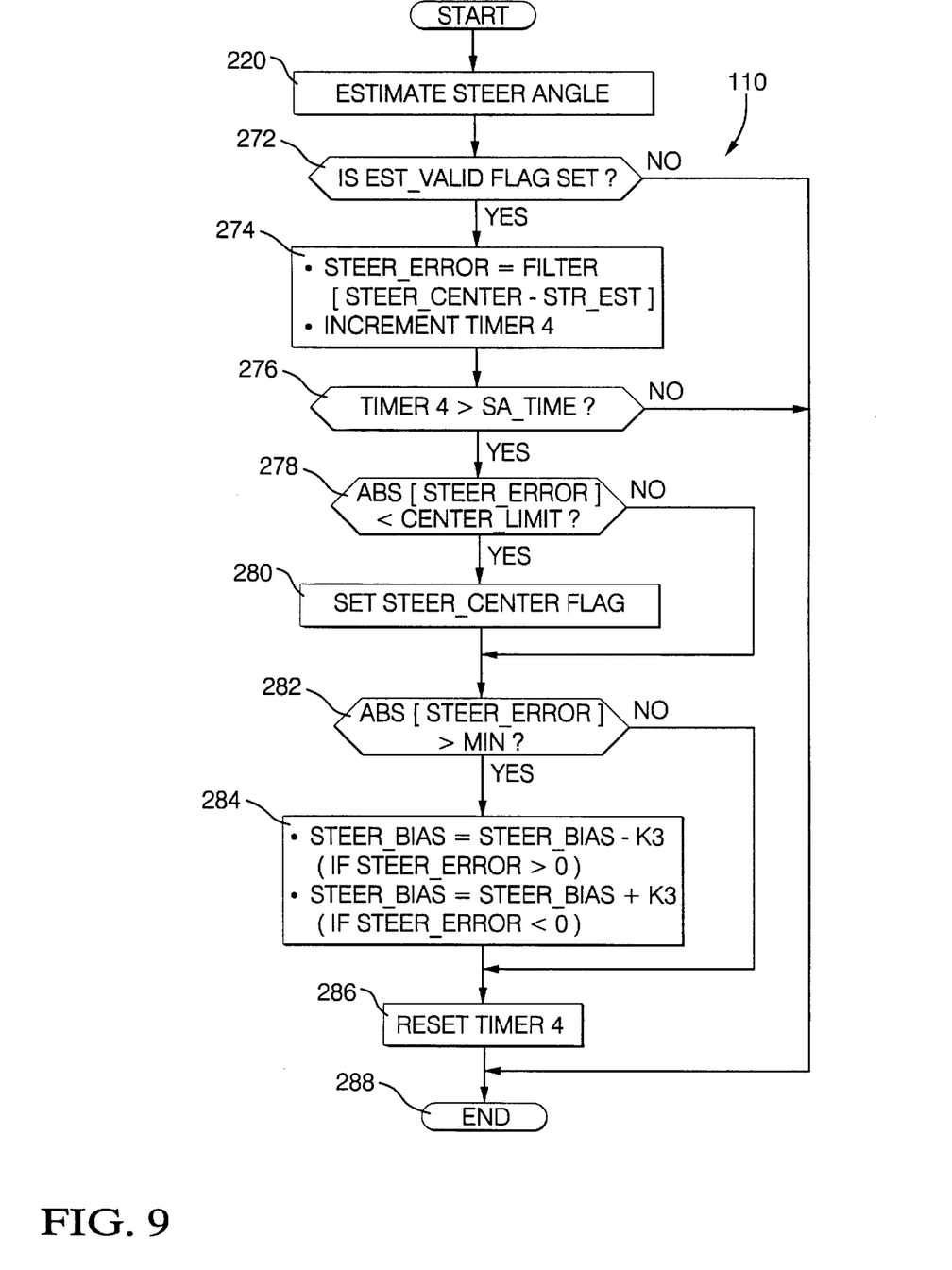

Referring now to FIG. 9, the subroutine takes into account the fact that the steering wheel position determination, and yaw rate estimation based thereon, is sensitive to errors in both the yaw rate sensor and the lateral accelerometer. In this example, any accelerometer bias is treated as an equivalent steer bias error. Thus, by initializing the steer angle and periodically updating the steer angle, the accelerometer bias that changes with temperature is accounted for in the steer bias term as apparent steer bias. The apparent steer bias is updated only during normal driving conditions where the vehicle dynamics do not impose large instantaneous changes in the vehicle estimates for sensor errors. The restrictions imposed prevent errors due to application of brakes, large yaw rates, large steering wheel angles and driving in reverse.

The subroutine for updating STEER_BIAS starts and moves to block 220, where it performs the subroutine described above with reference to FIG. 8, to determine STR_EST. The routine then moves to block 272 where it checks to determine if the EST_VALID flag is set. If the EST_VALID flag is not set, the routine moves to block 288 and the subroutine 110 is exited. If, however, block 272 determines that the EST_VALID flag is set, the routine continues to block 274 where the value STEER_ERROR is determined as a filter result of the difference between the STEER_CENTER and STR_EST. The filter implemented may be a simple low pass filter with a 1 second time constant. Also at block 274, the value TIMER4 is incremented.

At block 276, the value TIMER4 is compared to the value SA_TIME (determined at blocks 258 and 260, FIG. 8). If, at block 276, TIMER4 is not greater than SA_TIME, the routine moves to block 288 and exits. If, however, TIMER4 is greater than SA_TIME, the routine moves to block 278 where it compares the absolute value of STEER_ERROR to a predetermined threshold CENTER_LIMIT. If the absolute value of STEER_ERROR is not less than CENTER_LIMIT, the routine continues directly to block 282. If, however, the absolute value of STEER_ERROR is less than CENTER_LIMIT, the routine moves from block 278 to 280 where it sets the flag STEER_CENTER.

Next, at block 282, the absolute value of STEER_ERROR is compared to a threshold MIN. If STEER_ERROR is greater than MIN, the routine continues to block 284 where the value STEER_BIAS is updated according to:

STEER_BIAS=STEER_BIAS−k3(if STEER_ERROR>0), or

STEER_BIAS=STEER_BIAS+k3(if STEER_ERROR<0), where k3 is a predetermined constant (i.e., one degree) value at which STEER_BIAS is incremented or decremented.

The routine then continues to block 286 where the value TIMER4 is reset to zero and then the routine exits at block 288. If, at block 282, the absolute value of STEER_ERROR is not greater than MIN, no update to STEER_BIAS is necessary and the routine continues directly to block 286. An example value for MIN is one degree.

After completion of the subroutine 110, the routine in FIG. 3 continues to block 114 where the value STEER_CENTER is updated equal to the sum of STEER_CNTS and STEER_BIAS. The routine then continues to block 116 where it checks the flag CENTER_STOP. If the flag CENTER_STOP is not set, then the routine exits at block 120. If the flag CENTER_STOP is set, the routine moves to block 118 where it performs the subroutine, illustrated in FIG. 10, for updating $\omega_{corr}$. The purpose of the CENTER_STOP flag check at block 116 is to ensure that the wheel speed correction variable update, which relies on the output of the yaw rate sensor, is only run when the yaw rate sensor bias has been corrected while the vehicle was stopped (i.e., blocks 130–140, FIG. 4).

Figure 10:
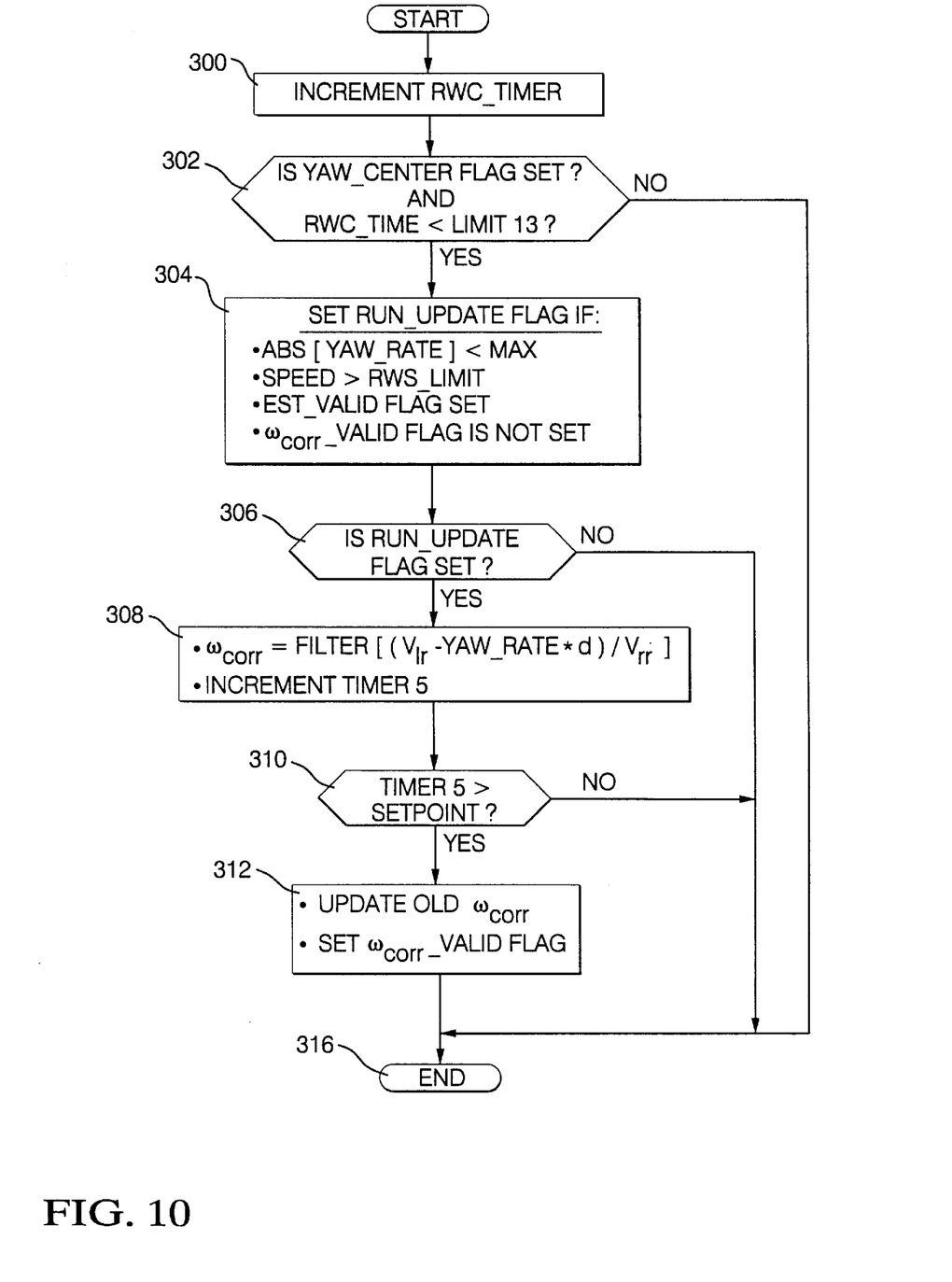

Referring now to FIG. 10, the subroutine is implemented because the effects of tire wear on the wheel speed information used to calibrate the yaw rate are too large to be ignored. Thus the correction factor is updated in the subroutine shown accounting for both tire wear and replacement of a tire, including going from an old to a new tire and adding an undersized spare. The routine starts and moves to block 300 where it increments the value RWC_TIMER. From block 300, the routine moves to block 302 where it checks the YAW_CENTER flag and compares RWC_TIMER to a threshold value LIMIT13. If the YAW_CENTER flag is not set or if RWC_TIMER is not less than LIMIT13, then the subroutine ends at block 316. If, however, both tests are met at block 302, the routine continues to block 304 where it sets a flag, RUN_UPDATE, if the following conditions are met: (a) the absolute value YAW_RATE is less than an upper limit, MAX, for example 10 degrees/second; (b) the vehicle speed is greater than a predetermined limit, for example, 40 Km/h; (c) the EST_VALID flag is set; and (d) the $\omega_{corr}$_VALID flag is not set. If any of the conditions (a)–(d) is not met, the RUN_UPDATE flag is not set.

The routine then moves to block 306 where it checks the RUN_UPDATE flag. If the RUN_UPDATE flag is not set, the routine exits at block 316. If, however, the RUN_UPDATE flag is set, the routine continues to block 308 where it determines the value $\omega_{corr}$ as the filtered result of: $(v_{1r}-YAW\_RATE*d)/v_{rr}$. The filter implemented at block 308 may be, for example, a simple low pass filter with a time constant of one second. Also at block 308, the value TIMER5 is incremented.

From block 308 the routine continues to block 310 where it compares the value TIMER5 to a threshold value SETPOINT. If TIMER5 is not greater than SETPOINT, the routine exits at block 316. If, however, at block 310, TIMER5 is greater than SETPOINT, the routine continues to block 312 where it updates the value $\omega_{corr}$ according to the result of block 308 and sets the $\omega_{corr}$_VALID flag. From block 312, the routine continues to block 316 where the subroutine 118 is exited.

Referring again to FIG. 3, after completion of the subroutine 118, the routine moves to block 120 where the sensor centering routine is completed.

Figure 11:
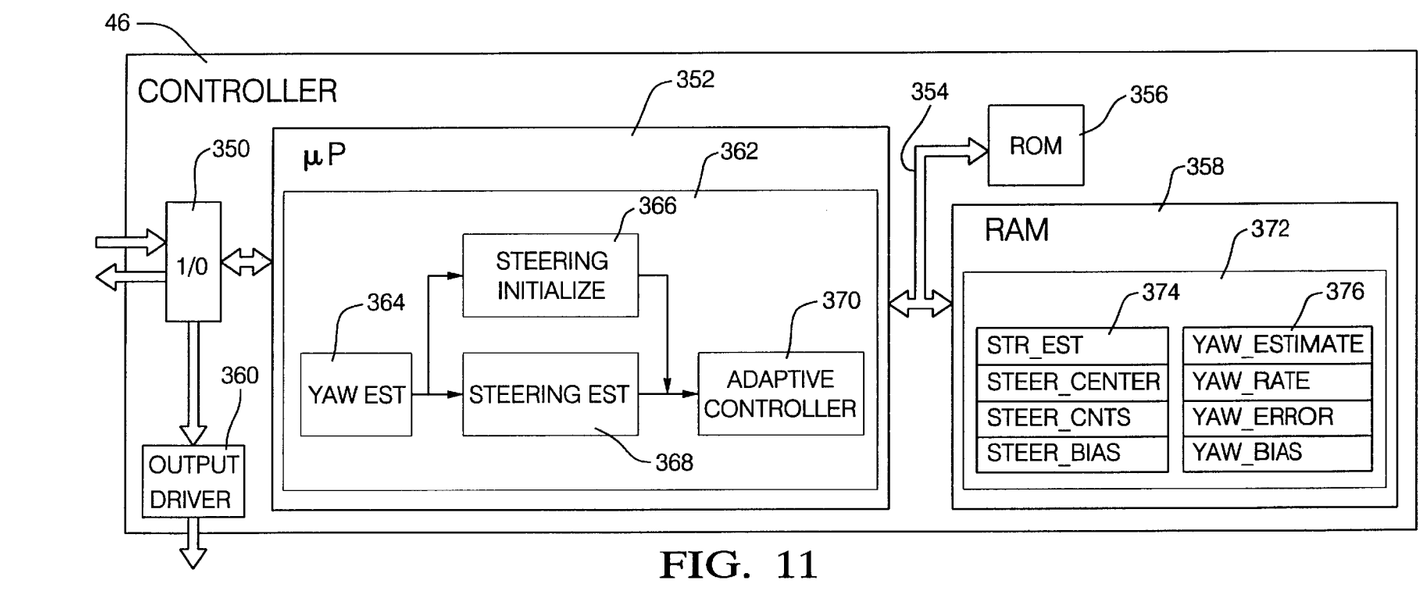
FIG. 11 illustrates an example of the control apparatus according to this invention.

Referring now to FIG. 11, it will be apparent to one skilled in the art that the example portions of the apparatus of this invention shown implement the method according to this invention described above. The controller 46 shown includes a microprocessor 352, input/output circuitry 350, ROM 356 and RAM 358 and output driver 360. The input/output circuit 350 receives signals from the various sensors and peripheral devices described above and provides the received information to microprocessor 352. Microprocessor 352 runs a set of instructions stored in ROM 356 and uses bi-directional data bus 354 to move information between ROM 356, RAM 358 and microprocessor 352. The ROM and RAM may be either part of the microprocessor 352 or separate therefrom.

In performing the instructions stored in ROM, the microprocessor 352 comprises the apparatus 362 including a yaw rate estimator 364 (i.e., described above with respect to FIG. 4). The output of the yaw rate estimator is fed first to the steering initializer 366 (i.e., described above with respect to FIG. 7) and then after the steering initializer has completed its task, to the steering estimator (i.e., described above with respect to FIG. 9). Using the information from the steering estimator, the steering position adaptive controller 370 updates the steering angle information according to this invention, i.e., block 114, FIG. 3.

In carrying out the tasks such as described in the above example, the microprocessor 352 stores in RAM 358, in a set 372 of tables 374, 376, either in successively numbered memory locations or having no apparent memory numbering sequence, values for the various variables including STR_EST, STEER_CENTER, STEER_CNTS and STEER_BIAS (table 374) and YAW_ESTIMATE, YAW_RATE, YAW_ERROR and YAW_BIAS (table 376).

During vehicle "engine on" time, the example apparatus according to this invention shown continuously operates, for example, as described above. During vehicle "power down," the steering wheel position signal may be stored in a "keep-alive" memory or other non-volatile memory and used as an initial value for the steering wheel position signal at power-up. Alternatively, the system may be reinitialized with every start-up of the vehicle.

Figure 12:
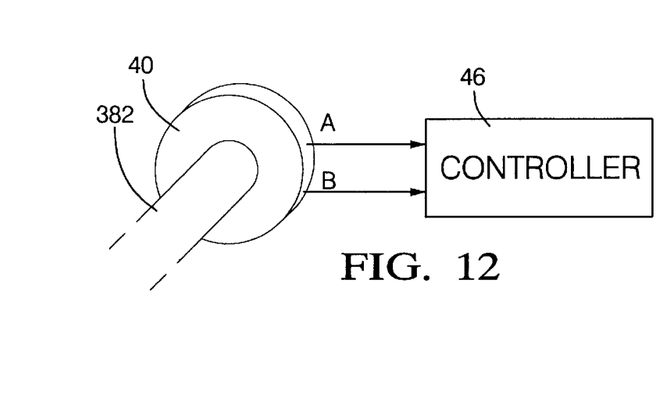
FIG. 12 illustrates schematically an example steering wheel position sensor for use with this invention.

FIG. 12 illustrates a sample sensor apparatus for steering wheel position sensor 40. The sensor 40 is of a type known to those skilled in the art and includes an optical encoder disc with two sets of optical windows operating with two optical transducers. Each of the two optical transducers sensor is triggered, for example, every two degrees of revolution of the steering wheel. The optical windows and transducers are arranged so that with each degree of rotation, the transducer being triggered alternates between the two transducers. In this manner, the output signals from the two transducers may be viewed as out of phase with respect to each other, one signal being referred to as Phase A and the other signal being referred to as Phase B.

Each signal is input to a trigger capture circuit that provides an interrupt to the computer in controller 46 when the output changes form the 0 volt state to the 12 volt state and vice versa. The controller 46 enables only one of the circuit interrupts at any one time. At start-up, the Phase A circuit interrupt is enabled and the Phase B interrupt is disabled. From that point, the computer logic used to count the digital steering position operates as follows.

When Phase A is enabled, the controller responds when a transition is detected in the Phase A signal (i.e., high to low or low to high). When the transition is detected, the steering count is increased by one if Phase A and Phase B are both of the same state (i.e., both are high or both are low), otherwise, the steering count is decreased by one. Then the Phase B interrupt is enabled and Phase A is disabled.

With Phase B enabled and a transition is detected in the Phase B signal, the steering angle count is decreased by one if Phase B equals Phase A (i.e., both are high or both are low), otherwise, the steering count is increased by one. Then the Phase B interrupt is disabled and the Phase A interrupt is enabled again. From this point, the logic flip-flops between the Phase A and B enables and the steering angle count is responsively incremented or decremented as described above.

The trigger capture circuitry is of a type known to those skilled in the art and may be incorporated into the controller 46 or may be separately packaged with the sensor 40.

As described above, the sensor uses an optical encoder to generate the pulses used to increment and decrement the counter. Any other suitable type of pulse generator known to those skilled in the art may be used as an alternative.

Figure 13:
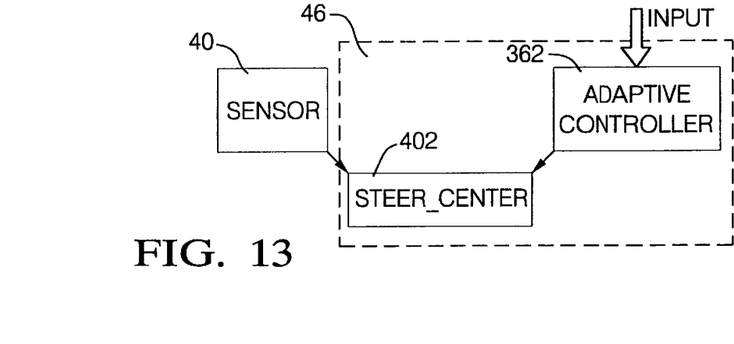
FIG. 13 illustrates operation of an example apparatus according to this invention.

Referring now to FIG. 13, example operation of the apparatus of this invention is shown. In the example, the controller 46 maintains the counter 402, keeping track of the steering position count, i.e., STEER_CENTER. The steering position in counter 402 is updated responsive to the outputs of sensor 40, such as the optical encoder described above. The counter 402 is also updated responsive to the adaptive control 362, which continuously performs adaptive updating of the counter 402 responsive to estimated yaw rate in the manner described above.

In the above example, the lateral accelerometer output is not updated to compensate for possible bias, as the invention can account for accelerometer bias as part of the steering angle bias. In certain control systems, it may be desirable to account for lateral accelerometer bias separately. This can be done as follows. The sum of the accelerometer output plus its bias offset is monitored over a period of time, for example, five minutes. In almost all driving conditions, the average output of the accelerometer over the period of time should equal zero. If the average output does not equal zero, but is greater than zero, a predetermined amount, for example, 0.01 G, is added to the accelerometer bias. If the average output is less than zero, the predetermined amount is subtracted from the accelerometer output. This routine may continuously run to remove accelerometer bias.

We claim:

1. A sensor responsive control method for use on a motor vehicle, comprising the steps of:
    maintaining a position sensor-responsive steering position signal responsive to a vehicle steering position sensor, wherein the sensor-responsive steering position signal increases in response to angular rotation of a vehicle steering wheel in a first direction and decreases in response to angular rotation of the vehicle steering wheel in a second direction opposite the first direction;
    measuring a vehicle yaw rate (102);
    measuring a vehicle lateral acceleration (48);
    responsive to the measured yaw rate and lateral acceleration estimating an estimated steering position signal (220);
    determining an error signal responsive to the position sensor-responsive steering position signal and the estimated steering position signal (226); and
    adaptively updating the position sensor-responsive steering of the position signal responsive to the error signal (114), wherein center position errors of the position sensor-responsive steering position signal are corrected for, wherein the step of measuring the vehicle yaw rate comprises the sub-steps of:
        determining whether the vehicle is stopped (130);
        receiving an output of a yaw rate sensor (48);
        determining a yaw bias responsive to the output (140); and
        determining the measured yaw rate as a sum of the yaw bias and the output (148).

2. A sensor-responsive control method for use on a motor vehicle, comprising the steps of:
    maintaining a position sensor-responsive steering position signal responsive to a vehicle steering position sensor, wherein the sensor-responsive steering position signal increases in response to angular rotation of a vehicle steering wheel in a first direction and decreases in response to angular rotation of the vehicle steering wheel in a second direction opposite the first directions;
    measuring a vehicle yaw rate (102);
    measuring a vehicle lateral acceleration (48);
    responsive to the measured yaw rate and lateral acceleration, estimating an estimated steering position signal (220);
    determining an error signal responsive to the position sensor-responsive steering position signal and the estimated steering position signal (226); and
    adaptively updating the position sensor-responsive steering position signal responsive to the error signal (114), wherein center position errors of the position sensor-responsive steering position signal are corrected for, wherein the step of measuring the vehicle yaw rate comprises the sub-steps of:
        determining an initial estimate responsive to measured left and right wheel speeds of undriven left and right vehicle wheels (142, 160); and
        validating the initial estimate if the vehicle is not decelerating more than a first predetermined threshold, is not in an active brake control mode and is moving greater than a predetermined minimum speed (162), wherein the validated initial estimate is the measured yaw rate.

3. A sensor-responsive control method according to claim 2, wherein the step of measuring the vehicle yaw rate also comprises the sub-steps of:
    determining a difference between the initial estimate and a present value estimated yaw rate (180);
    updating a yaw rate bias responsive to the difference (196); and
    determining the measured vehicle yaw rate responsive to the updated yaw rate bias (148).

4. A sensor-responsive control method for use on a motor vehicle, comprising the steps of:
    maintaining a position sensor-responsive steering position signal responsive to a vehicle steering position sensor, wherein the sensor-responsive steering position signal increases in response to angular rotation of a vehicle steering wheel in a first direction and decreases in response to angular rotation of the vehicle steering wheel in a second direction opposite the first direction;
    measuring a vehicle yaw rate (102);
    measuring a vehicle lateral acceleration (48);
    responsive to the measured yaw rate and lateral acceleration estimating an estimated steering position signal (220);
    determining an error signal responsive to the position sensor-responsive steering position signal and the estimated steering position signal (2260; and
    adaptively adjusting the position sensor-responsive steering position signal responsive to the error signal (114), wherein center position errors of the position sensor-responsive steering position signal are corrected for, also comprising the step of initializing the position sensor-responsive steering position signal according to the sub-step of:

estimating an initial steering position signal responsive to the measured yaw rate and the measured lateral acceleration (220);

determining a difference between the initial steering position signal and the adjusted position sensor-responsive steering position signal (224); and updating the adjusted position sensor-responsive steering position signal responsive to the difference (114).

5. A sensor-responsive control apparatus for use in a motor vehicle, comprising:

a steering sensor (40) providing position sensor signals responsive to movement of a steering wheel;

a position control maintaining a position sensor-responsive steer position signal (402) responsive to the position sensor signals, wherein the position sensor-responsive steer position signal is increased in response to angular rotation of the steering wheel in a first direction and is decreased in response to angular rotation of the steering wheel in a second direction opposite the first direction; and an adaptive controller (362) for estimating an output indicative of steering position responsive to a signal indicative of measured vehicle yaw rate and for adaptively updating the position sensor-responsive steer position signal responsive to the estimated output, wherein position errors of the position sensor-responsive steer position signal are corrected for, wherein (a) the position sensor signals comprise up signals when the steering wheel is turned in the first direction and down signals when the steering wheel is turned in the second direction, and (b) the position control comprises a counter that increments in response to the up signals and decrements in response to the down signals.

6. A sensor-responsive control method for use in a motor vehicle, comprising the steps of:

maintaining a position sensor-responsive steering position signal responsive to a vehicle steering position sensor, wherein the sensor-responsive steering position signal increases in response to angular rotation of a vehicle steering wheel in a first direction and decreases in response to angular rotation of the vehicle steering wheel in a second direction opposite the first direction:

determining an estimated steering position responsive to vehicle yaw rate, and adaptively adjusting the position sensor-responsive steering position signal responsive to the estimated steering position, wherein position errors of the position sensor-responsive steering position signal are corrected for;

wherein the step of maintaining the position sensor-responsive steering position signal comprises the sub-steps of:

receiving, from the vehicle steering position sensor, up signals when the steering wheel is rotated in the first direction and down signals when the steering wheel is rotated in the second direction;

incrementing the position sensor-responsive steering position signal in response to the up signals; and decrementing the position sensor-responsive steering position signal in response to the down signals.

* * * * *